R. A. & J. H. THOMPSON.
PEDAL OPERATED STEERING ATTACHMENT FOR AUTOMOBILES.
APPLICATION FILED APR. 18, 1916.
1,196,616.
Patented Aug. 29, 1916.
2 SHEETS—SHEET 1.
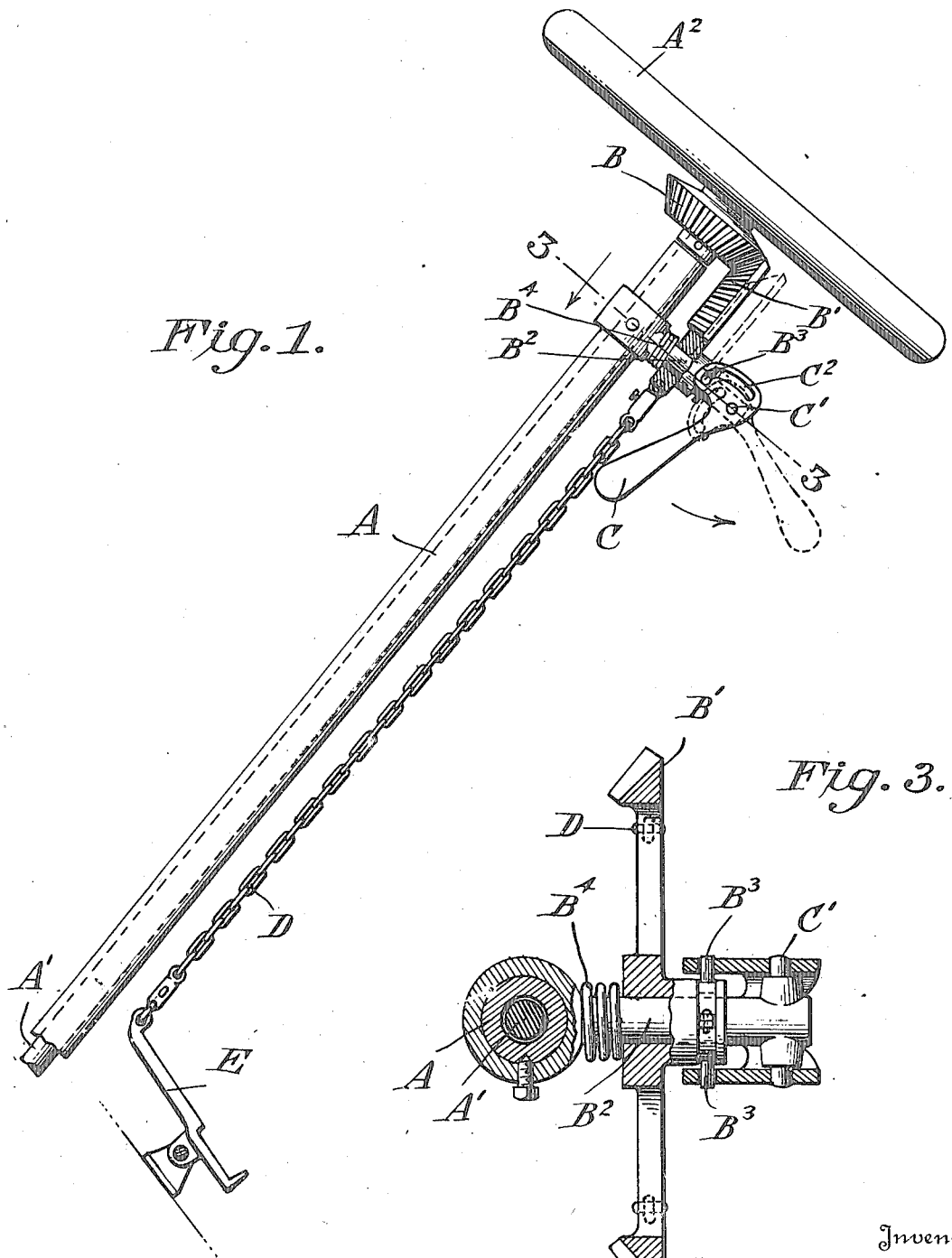

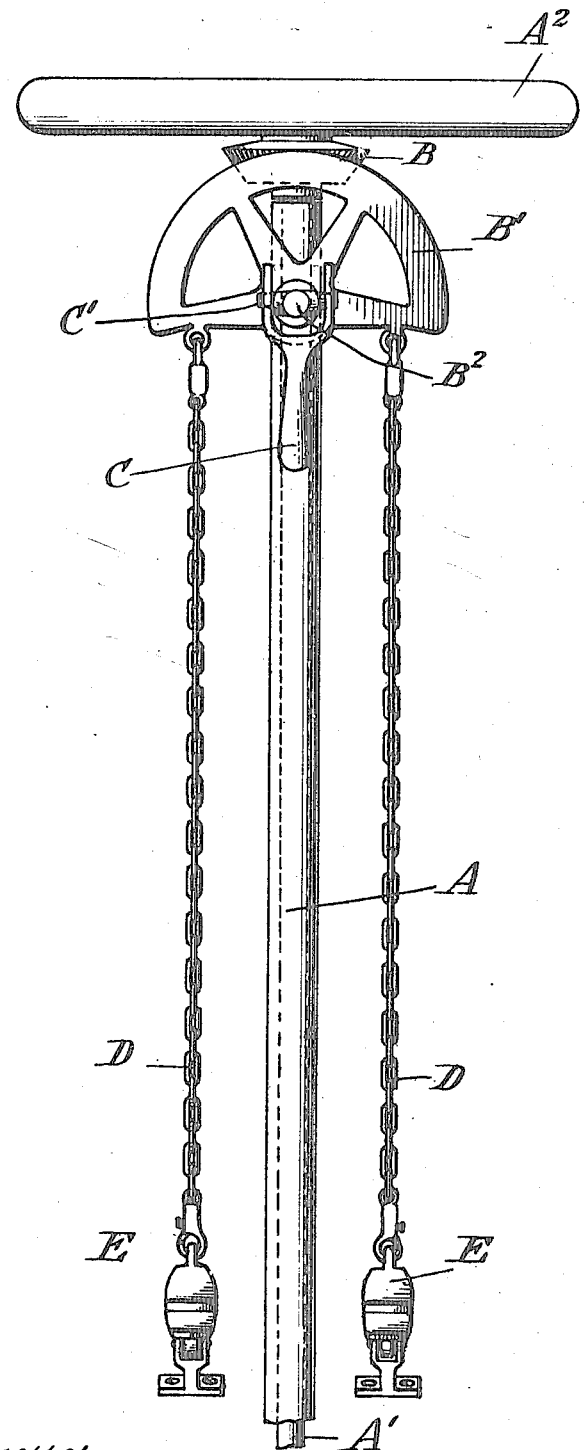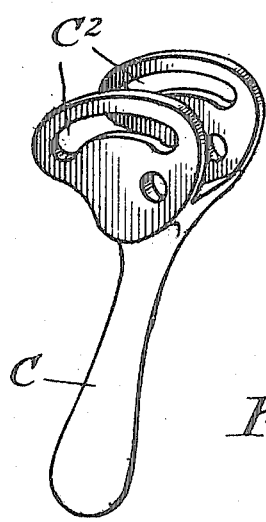
Fig. 2.
Fig. 4.

UNITED STATES PATENT OFFICE.

ROBERT A. THOMPSON AND JOHN H. THOMPSON, OF PLAINVILLE, KANSAS.

PEDAL-OPERATED STEERING ATTACHMENT FOR AUTOMOBILES.

1,196,616.  Specification of Letters Patent.  Patented Aug. 29, 1916.

Application filed April 18, 1916.  Serial No. 91,999.

*To all whom it may concern:*

Be it known that we, ROBERT A. THOMPSON and JOHN H. THOMPSON, citizens of the United States, residing at Plainville, in the county of Rooks and State of Kansas, have invented certain new and useful Improvements in Pedal-Operated Steering Attachments for Automobiles; and we do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful attachments for the steering mechanism of automobiles and it has for its object to provide a device which will steady and hold the front wheels of an automobile in line while the same is traveling through sand, snow, mud or passing over rough ground.

This invention makes it possible for the operator of a machine to use his feet to assist and at times relieve his hands, especially in cold weather, should his hands become numbed with cold.

The invention comprises various details of construction, combinations and arrangements of parts, all as will be more fully hereinafter described, shown in the accompanying drawings and then specifically defined in the appended claims.

Our invention is illustrated in the accompanying drawings, in which:

Figure 1 is a side elevation of a steering post, showing our invention applied thereto. Fig. 2 is a front view of the same. Fig. 3 is an enlarged detail section taken on line 3—3 of Fig. 1, and Fig. 4 is an enlarged detail perspective view of the operating lever.

Reference now being had to the details of the drawings by letter, A designates the steering post of an automobile in which is mounted for rotation the usual steering shaft A', having secured at its upper end the steering wheel $A^2$. Secured to the upper end of said shaft, just below the wheel $A^2$, is a pinion B which is in mesh with a segment B' which is mounted for rotation and sliding movement on a stub shaft $B^2$ which in turn is fixed to the upper end of the post A. A lever C is pivotally mounted on a pin C' fixed to the outer end of the stub shaft $B^2$ and is provided with cam slots $C^2$ which engage pins $B^3$ carried by the hub of the segment B'. By operating the lever C, the segment may be thrown and held in and out of engagement with the pinion B, as shown by dotted lines in Fig. 1 of the drawings. A spring $B^4$ is interposed between the segment B' and the hub of the stub shaft $B^2$ to hold the segment in its adjusted position. Suitable chains or other flexible members D are attached to the opposite sides of the segment and their lower ends are connected to the ends of foot-operated pedals E which may be located within easy reach of the operator.

From the foregoing description, it will be seen that an operator may quickly throw the segment into gear with the pinion and use his feet to relieve his hands.

What we claim to be new is:—

1. In combination with a post and a steering shaft journaled therein, a pinion mounted on the shaft, a segment pivoted upon the post, means for turning the segment, and a lever pivotally supported with relation to the post and engageable with the segment to move the same in and out of engagement with the pinion.

2. In combination with a post and a shaft journaled therein, a pinion mounted on the shaft, a segment pivoted on the post, means for turning the segment, a lever fulcrumed with relation to the post and having a cam slot, and a pin carried by the segment and lying in the slot.

3. In combination with a post and a shaft journaled therein, a pinion mounted on the shaft, a segment turnably and slidably mounted on the post, means for turning the segment, a lever pivotally supported on the post and having a cam slot, a pin carried by the segment and lying in the slot, and a spring supported by the post and bearing against the segment and being under tension with a tendency to force the segment toward the pivot of the lever.

In testimony whereof we hereunto affix our signatures in presence of two witnesses.

ROBERT A. THOMPSON.
JOHN H. THOMPSON.

Witnesses:
W. F. HUGHES,
EARL T. GINOPIE.